United States Patent [19]

Dean

[11] Patent Number: 4,504,627

[45] Date of Patent: Mar. 12, 1985

[54] METHYLMETHACRYLATE/N-PHENYL-MALEIMIDE COPOLYMER-CONTAINING POLYMER ALLOYS

[75] Inventor: Barry D. Dean, Springfield, Pa.

[73] Assignee: Atlantic Richfield Company, Los Angeles, Calif.

[21] Appl. No.: 531,318

[22] Filed: Sep. 12, 1983

[51] Int. Cl.³ .................................................. C08L 39/04
[52] U.S. Cl. ..................................... 525/205; 525/73; 525/97; 526/262
[58] Field of Search ................... 525/205, 73; 526/262

[56] References Cited

U.S. PATENT DOCUMENTS 3,676,404 7/1972 Nield ..................................... 526/262
4,381,373 4/1983 Ikuma ................................... 525/205

Primary Examiner—Jacob Ziegler
Attorney, Agent, or Firm—Dennis M. Kozak

[57] ABSTRACT

Polymer alloys containing copolymers of methylmethacrylate/N-phenylmaleimide are disclosed. In one embodiment the polymer alloy is an alloy of methylmethacrylate/N-phenylmaleimide and styrene/acrylonitrile. In another embodiment, the polymer alloy is an alloy of methylmethacrylate/N-phenylmaleimide and stryene/acrylonitrile/N-phenylmaleimide.

11 Claims, No Drawings

METHYLMETHACRYLATE/N-PHENYLMALEIMIDE COPOLYMER-CONTAINING POLYMER ALLOYS

This invention relates to polymer compositions.

More specifically, this invention pertains to the discovery of polymers which are fully compatible with one another.

In one of its more specific aspects this invention pertains to polymer alloys comprising methylmethacrylate/N-phenylmaleimide copolymers.

The incompatibility of polymers with one another is well established. And, coming up with a workable combination of polymers is still as much luck and art as it is science.

In the past, the terms "polymer alloy" and "polymer blend" or "polyblend" were used interchangeably. Technically, and as used herein, the term "polymer alloy" means a combination of polymers which are fully compatible with one another. Blends, by contrast, are formed by physically combining resins that are less than fully compatible with one another. Typically, the claim of full compatibility of polymers i.e. full miscibility, is shown by total thermodynamic miscibility as determined by glass transition temperature analysis.

According to this invention there is provided a polymer alloy comprising a first and a second polymer wherein, the first polymer is a random copolymer of recurring units of methylmethacrylate and recurring units of N-phenylmaleimide and the second polymer is a random copolymer or terpolymer of recurring units of styrene, recurring units of acrylonitrile and, optionally, recurring units of N-phenylmaleimide whereby the first and second polymers are fully compatible with one another.

In one embodiment, the polymer alloy is an alloy of a methylmethacrylate/N-phenylmaleimide copolymer with a styrene/acrylonitrile copolymer.

In another embodiment, the polymer alloy is an alloy of a methylmethacrylate/N-phenylmaleimide copolymer with a styrene/acrylonitrile/N-phenylmaleimide terpolymer.

In another embodiment, in order to impart improved impact strength properties, the polymeric material alloyed with the methylmethacrylate/N-phenylmaleimide copolymer, i.e. the styrene/acrylonitrile copolymer or the styrene/acrylonitrile/N-phenylmaleimide terpolymer, is chemically grafted to a rubber. Such materials can be prepared or are commercially available. Alternatively, the copolymer or terpolymer grafted to a rubber can be added as a separate component in addition to the styrene/acrylonitrile copolymer or N-phenylmaleimide-containing terpolymer.

The random methylmethacrylate/N-phenylmaleimide copolymer suitable to produce the polymer alloys of this invention will have a peak molecular weight within the range of from about 100,000 to about 500,000 preferably 250,000 to 350,000. The copolymer can be prepared by a free radical polymerization in solution, in bulk or by suspension. The copolymer will comprise from about 1 to about 50 weight percent N-phenylmaleimide and 99 to 50 weight percent methylmethacrylate. Preferably, the copolymer will be prepared by suspension polymerization and will comprise in weight percent, 1 to 40 N-phenylmaleimide and 99 to 60 methylmethacrylate.

In order to maintain molecular weight, it is necessary to stabilize the methylmethacrylate/N-phenylmaleimide copolymer prior to any type of thermal processing, using any of the commercially available antioxidants. The preferred antioxidant is an equal weight percent mixture of N,N-diphenyl-p-phenylene diamine and tris(mono and dinonyl)phenyl phosphite. The total amount of antioxidant employed should be within the range of from about 1 to about 2 weight percent added to the total weight percent of the polymer alloy.

The random styrene/acrylonitrile copolymers suitable to produce the polymer alloys of this invention are commercially available and will be selected to contain, in weight percent, within the range of from about 5 to about 35 recurring units of acrylonitrile, preferably from about 14 to about 30. The copolymer should also possess a peak molecular weight within the range of from about 100,000 to about 300,000.

Suitable styrene/acrylonitrile copolymers are commercially available from Monsanto Plastics & Resins Company, a unit of Monsanto Company under the designation Lustran® SAN Resins. Particularly suitable copolymers are designated Lustran®-31 and Lustran®-33.

Lustran® SAN 31 Resin contains 23.5 weight percent acrylonitrile and has a peak molecular weight of 128,000.

Lustran® SAN 33 Resin contains 33.2 weight percent acrylonitrile and has a peak molecular weight of 105,000.

The styrene/acrylonitrile/N-phenylmaleimide terpolymers suitable for use in this invention can also be prepared by a free radical polymerization in solution, in bulk or by suspension. The terpolymer will comprise in weight percent, within the range of from about 65 to 73 styrene, 20 to 34 acrylonitrile and 1 to 7 weight percent N-phenylmaleimide. The peak molecular weight of the terpolymer should be within the range of from about 100,000 to about 500,000.

Any suitable styrene/acrylonitrile copolymer or N-phenylmaleimide-containing terpolymer grafted to a rubber can be employed to produce a polymer alloy according to this invention.

A particularly suitable styrene/acrylonitrile copolymer grafted to a rubber is designated Royalene® PM 1000 Resin, commercially available from Uniroyal Chemical Division of Uniroyal Inc.

Royalene® PM 1000 Resin is a styrene/acrylonitrile copolymer grafted with an EPDM rubber (S/AN-g-EPDM) (50:50 weight percent) having a styrene matrix acrylonitrile content of about 26 weight percent.

Styrene/acrylonitrile/N-phenylmaleimide terpolymers grafted to rubbers are not known to be commercially available. However, such materials can be prepared using known methods, for example, the method taught in Example I of U.S. Pat. No. 3,489,822.

Since the polymer alloys of this invention exhibit full miscibility, their polymeric components can be alloyed with one another in amounts within broad ranges. The polymer alloys of this invention can be comprised of each of their polymeric components in amounts within the range of from about 1 to 99 weight percent based on the total weight of the alloy. This in turn facilitates the tailoring of their physical properties, to meet the physical property requirements of any number of end use applications.

Moreover, the polymer alloys of this invention may be prepared using any suitable method of blending.

Preferably, the alloys are prepared by melt mixing at a temperature above the softening points of the alloys using any conventional high shear melt mixing apparatus, including twin screw extruders, single screw extruders and the like. The polymer alloy extrudate can be chopped into pellets and molded using any conventional molding including: injection molding, rotomolding, compression molding and the like. The word "molding" is meant to encompass all sheet and profile extrusion.

Having described the materials and methods of this invention reference is now made to the following examples which serve to demonstrate the invention.

EXAMPLE I

This example demonstrates the preparation of a methymethacrylate/N-phenylmaleimide copolymer suitable for use to prepare polymer alloys of this invention.

A citrate bottle was charged with 52.5 g of methylmethacrylate, 17.5 g of N-phenylmaleimide, 140 g of distilled water, 10 milliliters of a 9.1% (wt.) tricalcium phosphate in water solution as the suspending agent, 0.003 g of sodium bisulfite, 0.14 g of t-butyl peroctoate and 0.06 g of t-butyl perbenzoate. The citrate bottle was placed in a bottle polymerizer at 95° C. for 3 hours then 135° C. for 2 hours. The beads recovered contained 23.5 wt.% N-phenylmaleimide, exhibited a Tg (°C., DSC) of 143 and a peak molecular weight of 365,000.

EXAMPLE II

This example demonstrates the preparation of a polymer alloy of this invention.

Five hundred grams of the methylmethacrylate/N-phenylmaleimide copolymer beads prepared in Example I were melt compounded at about 475° F. with 500 grams of styrene/acrylonitrile copolymer pellets (Lustran ® 31 SAN).

Following Table I shows physical property values obtained for the methylmethacrylate/N-phenylmaleimide-sytrene/acrylonitrile (MMA/NPMI-S/AN) polymer alloy of Example II as compared to the property values separately found for each copolymer component.

TABLE I

| Property | Unit | ASTM | MMA/NPMI (Example I) | Lustran ® SAN 31 | MMA/NPMI—S/AN (Example II) |
|---|---|---|---|---|---|
| Tensile Strength | psi | D-638 | 9,300 | 9,500 | 10,300 |
| Flexural Strength | psi | D-790 | 16,200 | 16,500 | 17,400 |
| Flexural Modulus | psi | D-790 | 560,000 | 510,000 | 547,000 |
| Tg | °C. | * | 143 | 109 | 127 |
| DTUL | ⅛, °F. | D-648 | 244 | 183 | 217 |
| Notched Izod | ft-lbs/in | D-256 | 0.6 | 0.7 | 0.6 |

* Glass transition temperature data was obtained by differential scanning calorimetry (DSC) and applied to the Flory-Fox relationship.

EXAMPLE III

This example demonstrates the preparation of a polymer alloy of this invention.

Five hundred grams of the methylmethacrylate/N-phenylmaleimide copolymer beads prepared in Example I were melt compounded at about 475° F. with 500 grams of styrene/acrylonitrile copolymer pellets (Lustran ® 33 SAN).

Following Table II shows physical property values obtained for the methylmethacrylate/N-phenylmaleimide-sytrene/acrylonitrile/polymer alloy of Example III, as compared to the material property values separately found for each copolymer component.

TABLE II

| Property | Unit | ASTM | MMA/NPMI (Example I) | Lustran ® SAN 33 | MMA/NPMI—S/AN (Example III) |
|---|---|---|---|---|---|
| Tensile Strength | psi | D-638 | 9,300 | 10,700 | 10,800 |
| Flexural Strength | psi | D-790 | 16,200 | 17,000 | 17,300 |
| Flexural Modulus | psi | D-790 | 560,000 | 555,000 | 550,000 |
| Tg | °C. | * | 143 | 109 | 127 |
| DTUL | ⅛,°F. | D-648 | 244 | 184 | 216 |
| Notched Izod | ft-lbs/in | D-256 | 0.6 | 0.7 | 0.6 |

* Glass transition temperature data was obtained by differential scanning calorimetry (DSC) and applied to the Flory-Fox relationship.

EXAMPLE IV

This example demonstrates the preparation of a styrene/acylonitrile/N-phenylmaleimide terpolymer suitable for use to prepare polymer alloys of this invention.

A 1 liter resin kettle was charged with 500 grams of styrene and 140 grams of acrylonitrile. The resin kettle was heated to 85° C. Immediately on reaching 85° C., dropwise addition of a solution of 60 grams styrene, 15 grams of N-phenylmaleimide and 0.4 grams of benzoyl peroxide was started. The dropwise addition was conducted over 5 hours. The polymer was recovered by precipitation in methanol. The overall conversion was 50% based on total monomer weight. The terpolymer has the following composition: 72% styrene, 24% acrylonitrile (IR determination), and 4% N-phenylmaleimide (% N determination). The S/AN/NPMI terpolymer exhibited a Tg (°C., DSC) of 113.5 and a peak molecular weight of 150,000.

EXAMPLE V

This example serves to demonstrate the complete miscibility of the S/AN/NPMI (72/24/4) terpolymer prepared in Example IV with MMA/NPMI copolymers.

A MMA/NPMI copolymer was prepared in accordance with Example I except that the N-phenylmaleimide monomer charge was adjusted to obtain a copolymer having 20% N-phenylmaleimide by weight.

The S/AN/NPMI terpolymer and the MMA/NPMI copolymer were combined by dissolving both in tetrahydrofuran followed by precipitation in methanol. Following Table III shows that the S/AN/NPMI terpolymer is fully miscible with MMA/NPMI copolymer.

TABLE III

| | Tg (°C., DSC) |
|---|---|
| MMA/NPMI (80/20) | 138.5 |
| S/AN/NPMI (72/24/4) | 113.5 |
| 50% MMA/NPMI: 50% S/AN/NPMI | 125.5 |

The data of Table III serve to show that a polymer alloy of MMA/NPMI with terpolymers of S/AN/NPMI, would inherently exhibit improved heat resistance due to the higher glass transition temperatures of the terpolymer as compared to a styrene/acrylonitrile copolymer.

EXAMPLE VI

This example demonstrates the preparation of a polymer alloy of this invention which employs a styrene/acrylonitrile-g-EPDM copolymer.

Six hundred eighty grams of the MMA/NPMI copolymer beads prepared in Example I were melt compounded at about 480° F. with 320 grams of Royalene ® PM 1000 Resin copolymer pellets.

Following Table IV shows the physical property values obtained for the polymer alloy.

TABLE IV

|  | MMA/NPMI-S/AN-g-EPDM |
|---|---|
| Tensile Strength (psi) | 7,440 |
| Flex Strength (psi) | 11,800 |
| Flex Modulus (psi) | 325,000 |
| Tg (°C. DSC) | 135 |
| DTUL (¼", °F.) | 221 |
| Gardner Falling Weight Index (Ft-lbs/in) | 208 |
| Notched Izod (ft-lbs/in) | 4.5 |

The above data in Tables I–IV serve to show that polymer alloys of this invention exhibit certain physical properties which are good median properties and certain other physical properties which are better than the weighted averages of the base polymers.

It will be evident from the foregoing that various modifications can be made to this invention. Such, however, are considered to be within the scope of this invention.

What is claimed:

1. A polymer alloy comprising a first and a second polymer wherein,
   (a) the first polymer is a random copolymer consisting essentially of recurring units of methylmethacrylate and recurring units of N-phenylmaleimide; and
   (b) the second polymer is a random copolymer or terpolymer of recurring units of styrene, recurring units of from about 5 to about 35 weight percent acrylonitrile, and, 0 to 7 weight percent of recurring units of N-phenylmaleimide.

2. The polymer alloy of claim 1 in which said second polymer is a random copolymer of styrene/acrylonitrile.

3. A polymer alloy of claim 1 in which said second polymer is a random terpolymer of styrene/acrylonitrile/N-phenylmaleimide.

4. The polymer alloy of claim 1 in which said first polymer is present in an amount within the range of from about 1 to 99 weight percent based on the total weight of the polymer alloy.

5. The polymer alloy of claim 1 in which said second polymer is present in an amount within the range of from about 1 to 99 weight percent based on the total weight from about 1 to 99 weight percent based on the total weight of the polymer alloy.

6. The polymer alloy of claim 1, in which in said first polymer the N-phenylmaleimide is from about 1 to about 50 weight percent.

7. The polymer alloy of claim 1 in which in said first polymer the methylmethacrylate is from about 99 to about 50 weight percent.

8. The polymer alloy of claim 2 in which said second polymer comprises from about 5 to about 35 weight percent acrylonitrile and from about 95 to about 65 weight percent styrene.

9. The polymer alloy of claim 3 in which said second polymer comprises from about 65 to about 73 weight percent styrene, from about 20 to about 34 weight percent acrylonitrile and from about 1 to about 7 weight percent N-phenylmaleimide.

10. The polymer alloy of claim 1 in the form of a molded article.

11. A method of producing a molded article which comprises:
    (a) preparing a polymer alloy comprising a first and a second polymer wherein,
       (i) the first polymer is a random copolymer consisting essentially of recurring units of methylmethacrylate and recurring units of N-phenylmaleimide; and
       (ii) the second polymer is a random copolymer or terpolymer of recurring units of styrene, recurring units of from about 5 to about 35 weight percent acrylonitrile, and, 0 to 7 weight percent of recurring units of N-phenylmaleimide; and
    (b) molding the resulting polymer alloy.

* * * * *